United States Patent
Hwang et al.

(10) Patent No.: US 8,006,034 B2
(45) Date of Patent: Aug. 23, 2011

(54) INFORMATION RECORDING MEDIUM, RECORDING AND/OR REPRODUCING APPARATUS, AND RECORDING AND/OR REPRODUCING METHOD

(75) Inventors: Sung-hee Hwang, Suwon-si (KR); Won-hee Lee, Suwon-si (KR); Joon-hwan Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 473 days.

(21) Appl. No.: 12/203,343

(22) Filed: Sep. 3, 2008

(65) Prior Publication Data

US 2009/0080304 A1    Mar. 26, 2009

(30) Foreign Application Priority Data

Sep. 21, 2007 (KR) .................. 10-2007-0096964

(51) Int. Cl.
  *G06F 12/00* (2006.01)
  *G11B 5/09* (2006.01)
(52) U.S. Cl. .... 711/111; 711/156; 369/53.2; 369/53.24; 369/53.41; 369/47.1
(58) Field of Classification Search .......... 711/111, 711/156; 369/53.2, 53.24, 53.41, 47.1
  See application file for complete search history.

(56) References Cited

U.S. PATENT DOCUMENTS

| 7,397,744 | B2 * | 7/2008 | Terada et al. ............... 369/53.2 |
| 7,911,900 | B2 * | 3/2011 | Park ........................ 369/47.22 |
| 2006/0007801 | A1 * | 1/2006 | Takashima ................ 369/44.27 |
| 2006/0233078 | A1 * | 10/2006 | Terada et al. ............ 369/53.24 |

FOREIGN PATENT DOCUMENTS

| CN | 1701376 A | 11/2005 |
| KR | 2006-22523 | 3/2006 |
| WO | WO 2004/079739 A1 | 9/2004 |
| WO | WO 2004/112025 A1 | 12/2004 |
| WO | WO 2006/025649 A1 | 3/2006 |
| WO | WO 2007/064177 A1 | 6/2007 |

OTHER PUBLICATIONS

International Search Report issued in PCT International Application No. PCT/KR2008/005247 on Mar. 20, 2009.

* cited by examiner

*Primary Examiner* — Jack A Lane
(74) *Attorney, Agent, or Firm* — NSIP Law

(57) ABSTRACT

An information recording medium, recording and/or reproducing apparatuses, and recording and/or reproducing methods which enable effective management of a last data recording address of a data area of the information recording medium. The information recording medium includes a data area for recording user data, temporary recording management information for managing a data recording status of the data area and temporary disc management information for managing the information recording medium, wherein the temporary disc management information includes first information regarding a last recorded location of data in the data area and second information regarding whether the information regarding the last recorded location is consistent with an actual last recorded location of the data area.

17 Claims, 10 Drawing Sheets

US 8,006,034 B2

INFORMATION RECORDING MEDIUM, RECORDING AND/OR REPRODUCING APPARATUS, AND RECORDING AND/OR REPRODUCING METHOD

CROSS-REFERENCE TO RELATED APPLICATION

This application claims the priority of Korean Patent Application No. 2007-96964, filed in the Korean Intellectual Property Office on Sep. 21, 2007, the disclosure of which is incorporated herein by reference.

BACKGROUND OF THE INVENTION

1. Field of the Invention

Aspects of the present invention relate to an information recording medium, and more particularly, to an information recording medium, a recording and/or reproducing apparatus, and a recording and/or reproducing method to effectively manage the last data recording address of a data area.

2. Description of the Related Art

Unlike rewritable information recording media, a last recorded address (LRA) of data in a conventional write-once information recording medium changes continuously as data is additionally recorded in the medium because the medium only allows data to be recorded once. Since the LRA is the last recorded address of data, the LRA allows detection of an outer circumference of a disc-type information recording medium where data is recorded. Thus, it is possible to estimate a physical operating range of a pick-up operation during data reproduction. Since file system-related information is recorded in a beginning part or an ending part of a write-once information recording medium, the LRA is important for data recording and/or reproducing.

FIG. 1 is a reference diagram to explain data recording in a write-once information recording medium 100 and a consequent recorded form of LRAs, according to the conventional art. The write-once information recording medium 100 comprises a lead-in area 110, a data area 120, and a lead-out area 130.

Data is recorded in the data area 120 according to first, second, and third recording operations. A drive system records every last recorded address (LRA) of data in the write-once information recording medium 100. The recording operation may be an operation performed, for example, from the time when the medium 100 is loaded on the drive system to record data until the time the medium is ejected. Information regarding an LRA1 140, which is a last recorded location of data recorded in the data area 120 during the first recording operation, is initially recorded in a predetermined region 170 in the lead-in area 110. Information regarding an LRA2 150, which is a last recorded location of data recorded in the data area 120 during the second recording operation, is then recorded in the predetermined region 170 after the information regarding the LRA 140. Information regarding an LRA3 160, which is a last recorded location of data recorded in the data area 120 during the third recording operation, is recorded in the predetermined region 170 after the information regarding the LRA 150.

Since the write-once information recording medium data cannot be overwritten, when every last recorded location of data is recorded in the information recording medium during each recording operation or after a predetermined recording operation, space of the information recording medium for recording the LRAs become drastically exhausted, which causes waste in capacity of the medium. In addition, in order to record the LRA, a drive system needs to take time to identify the exact last recorded location of data each time after a recording operation or a predetermined operation is performed, thereby deteriorating efficiency of system performance.

SUMMARY OF THE INVENTION

Aspects of the present invention provide an information recording medium, a recording and/or reproducing apparatus, and a recording and/or reproducing method to effectively manage the last data recording address of a data area of the information recording medium.

According to an aspect of the present invention, an information recording medium is provided. The information storage medium comprises a data area to record user data, temporary recording management information to manage a data recording status of the data area; and temporary disc management information to manage the information recording medium, wherein the temporary disc management information includes first information regarding a last recorded location of data in the data area and second information regarding whether the information regarding the last recorded location is consistent with an actual last recorded location of the data area.

According to another aspect of the present invention, the second information indicates that the information regarding the last recorded location is consistent with the actual last recorded location of the data area when the second information is a first value, and the second information indicates that the information regarding the last recorded location is not consistent with the actual last recorded location when the second information is a second value.

According to another aspect of the present invention, when the information recording medium is finalized, the first information in final temporary disc management information is changed to information regarding the actual last recorded location of the data area, and the second information in the final temporary disc management information is changed to information indicating that the information regarding the last recorded location is consistent with the actual last recorded location of the data area, and the final temporary disc management information may be recorded in a disc management area of the information recording medium.

According to another aspect of the present invention, an apparatus to record data to an information recording medium including a data area is provided. The apparatus includes a pickup to emit a light so as to transfer data with respect to the information recording medium; and a control unit to generate temporary disc management information to manage the information recording medium, the temporary disc management information including first information regarding a last recorded location of data in the data area and second information regarding whether the information regarding the last recorded location is consistent with an actual last recorded location of the data area, and to control the pickup to record the generated temporary disc management information on the information recording medium.

According to another aspect of the present invention, an apparatus to reproduce data from an information recording medium including a data area is provided. The apparatus comprises a pickup to emit or receives a light so as to transfer data with respect to the information recording medium; and a control unit to control the pickup to read temporary disc management information that includes first information regarding a last recorded location of data in the data area and second information regarding whether the information regarding the last recorded location is consistent with an actual last recorded location of the data area, and to determine the last recorded location of the data area based on the read temporary disc management information.

According to another aspect of the present invention, the control unit determines that the information regarding the last recorded location is consistent with the actual last recorded location of the data area when the second information is a first value, and determines that the information regarding the last recorded location is not consistent with the actual last recorded location of the data area when the second information is a second value.

According to another aspect of the present invention, the control unit searches a remaining part after the last recorded location of the information recording medium according to the information regarding the last recorded location for a actual last recorded location when the control unit determines that the information regarding the last recorded location is not consistent with the actual last recorded location of the data area.

According to another aspect of the present invention, the control unit controls the pickup to read a final recorded recording unit block from a remaining part after a last recorded location of the information recording medium according to the information regarding the last recorded location, and detect a actual last recorded location with reference to padding information included the read recording unit block.

According to another aspect of the present invention, a method of recording data in an information recording medium including a data area is provided. The method includes generating temporary disc management information to manage the information recording medium, the temporary disc management information comprising first information regarding a last recorded location of data in the data area and second information regarding whether the information regarding the last recorded location is consistent with an actual last recorded location of the data area; and recording the generated temporary disc management information onto the information recording medium.

According to another aspect of the present invention, a method of reproducing data from an information recording medium including a data area is provided. The method includes reading temporary disc management information from the information recording medium, the temporary disc management information comprising first information regarding a last recorded location of data in the data area and second information regarding whether the information regarding the last recorded location is consistent with an actual last recorded location of the data area; determining a last recorded location of the data area based on the read temporary disc management information; and reproducing data from the information recording medium based on the last recorded location of the data area.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
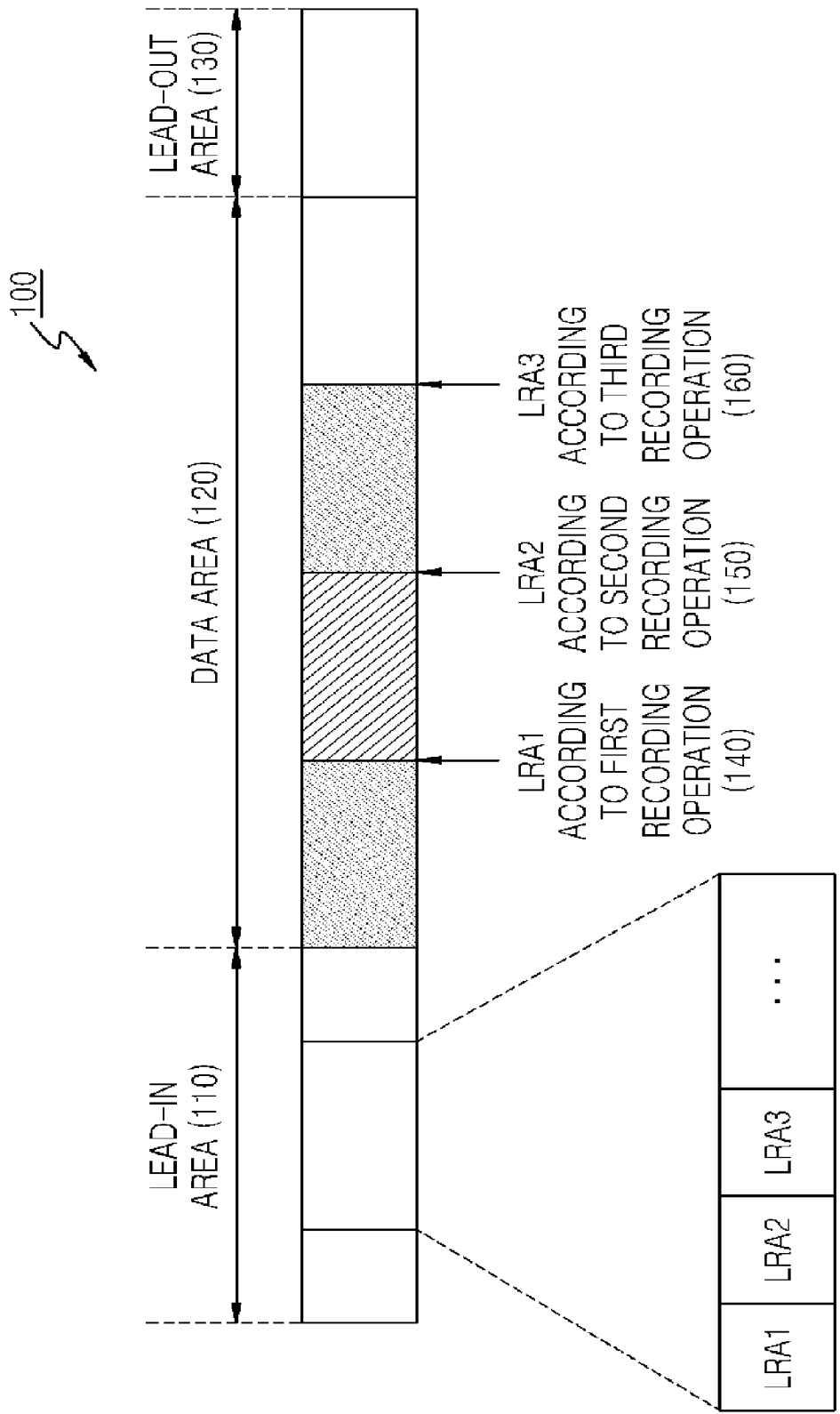
FIG. 1 is a reference diagram to explain data recording and a consequent recorded form of last recorded addresses (LRAs) in a write-once information recording medium, according to the conventional art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
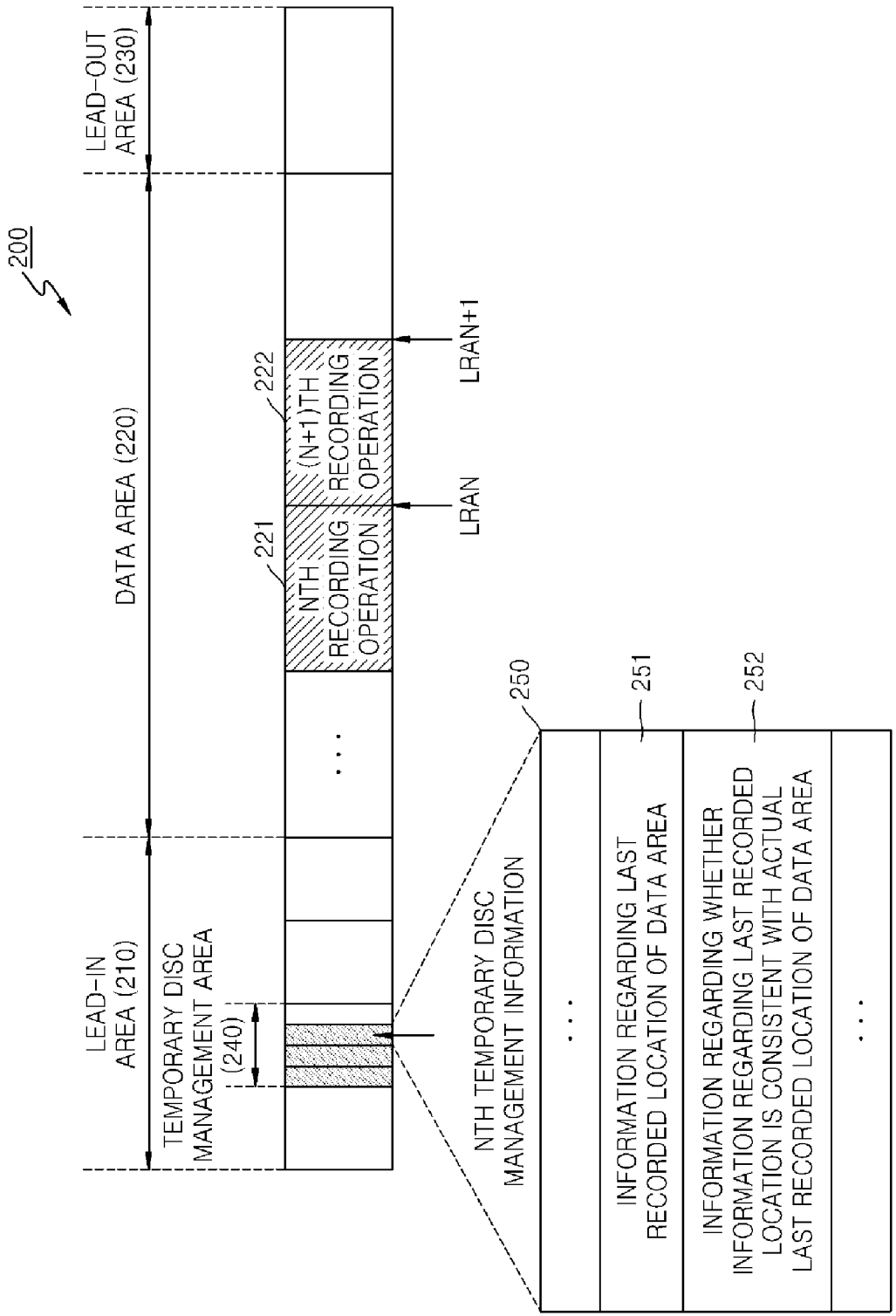
FIG. 2 is a reference diagram to explain how to record information regarding a last recorded location of a data area in a write-once information recording medium, according to an embodiment of the present invention.

FIG. 2 is a reference diagram to explain how to record information regarding a last recorded location of a data area 220 in a write-once information recording medium 200, according to an embodiment of the present invention. The write-once information recording medium 200 comprises a lead-in area 210, the data area 220, and a lead-out area 230.

The last recorded location of data 221 in the data area 220 resulting from an nth recording operation is LRA N. When a drive system records an nth temporary disc management information 250 in a temporary disc management area 240 to manage the recording information of the data recorded during the nth recording operation, the drive system creates the nth temporary disc management information 250 to include information 252 indicating whether information 251 regarding the last recorded location of the data area 220 is consistent with an actual last recorded location of the data area 220. The information 251 regarding the last recorded location of the data area 220 includes information regarding the LRA N. The information 252 indicating whether the information 251 regarding the last recorded location of the data area 220 is consistent with the actual last recorded location of the data area 220 can be set as "YES" if the locations are the same or "NO" if the locations are different, depending on the operation of the drive system.

For example, as shown in FIG. 2, the drive system may record the temporary disc management information by setting the information 252 indicating whether the information 251 about the last recorded location is consistent with the actual last location of the data area 220 as "YES" if the next recording operation is not predicted after the nth recording operation is complete, or by setting the information 252 as "NO" if the next recording operation is predicted immediately after the nth recording operation is complete. If the drive system records the temporary disc management information by setting the information 252 as "NO," the actual last recorded location LRA N+1 of the data area 220 is different from the information 251 (set as LRA N) regarding the last recorded location of the data area 220 which has been recorded in the nth temporary disc management information 250 after data is recorded 222 according to an n+1th recording operation. However, since the information 252 is set as "NO," the drive system is not required to record n+1th temporary disc management information after completing the n+1th recording operation. Hence, the capacity of the medium can be increased, and the time for recording the n+1th temporary disc management information can be reduced.

Figure 3:
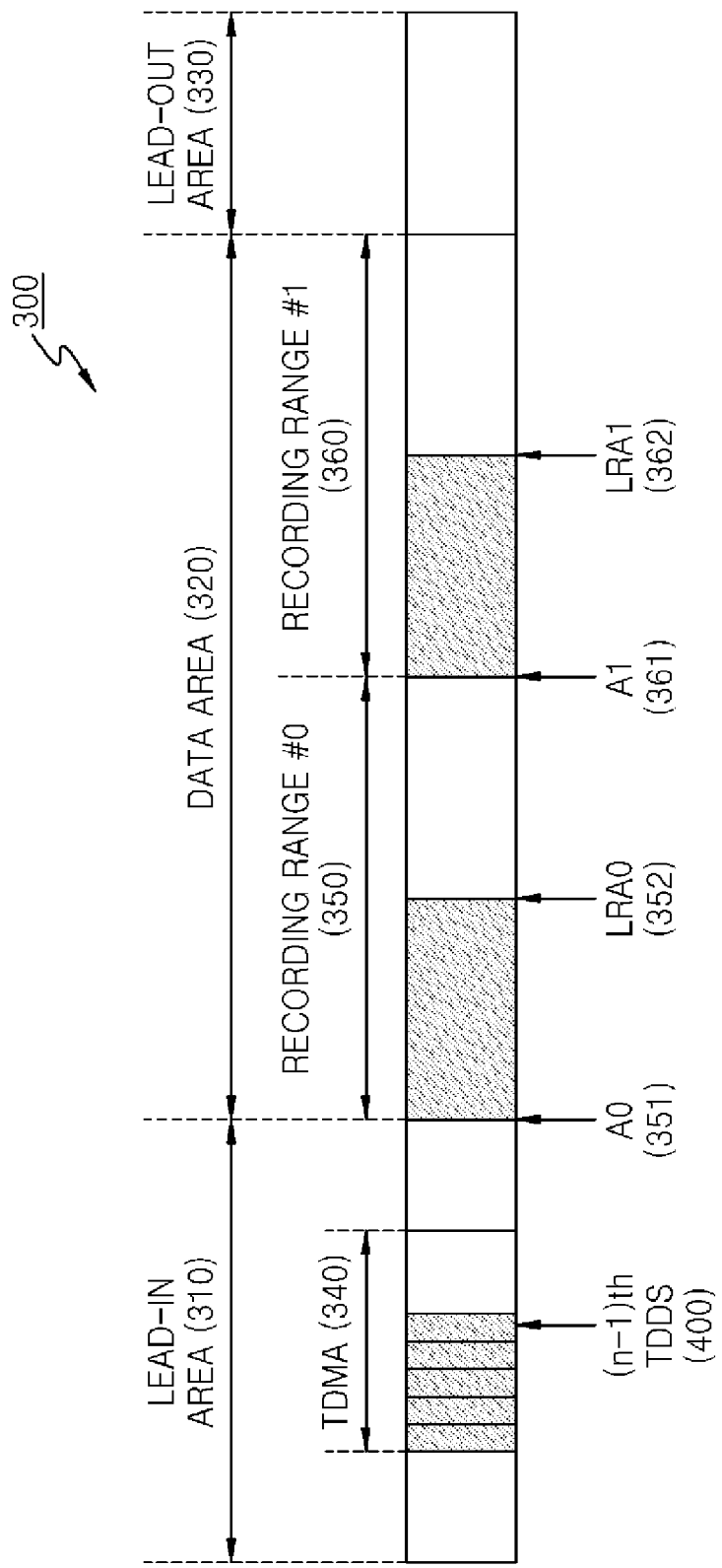
FIG. 3 illustrates a recording of information regarding a last recorded location of a data area in a write-once information recording medium, according to an embodiment of the present invention.

FIG. 3 is a reference diagram to explain a specific example of recording the information regarding the last recorded location of a data area 320 in a write-once information recording medium 300, according to an embodiment of the present invention. The write-once information storing medium comprises a lead-in area 310, the data area 320, and a lead-out area 330.

As shown in FIG. 3, the data area 320 is divided into several recording ranges, for example, a recording range #0 350 and a recording range #1 360, and data is recorded sequentially on each divided range according to a sequential recording method. In this case, a start address LRA0 and a last recorded address LRA1 of each recording range 350 and 360 are managed by a predetermined format, for example, a recording range entry.

Temporary recording range information (TRRI), which is recording management information, includes recording range entries. A recording location of the TRRI is managed by temporary disc management information, such as defect management and overwrite, which are used to operate a disk. The temporary disc management information may have a format of a temporary disc definition structure (TDDS). When recording the data, the TRRI including information regarding the last recorded address and the TDDS containing the location information or the TRRI are also recorded. When reproducing data, by reproducing the TDDS, the location information on the TRRI is obtained, and TRRI is reproduced based on the location information on the TRRI.

For faster reproduction, a last recorded address of the entire data area 320 of the information storing medium 300 may be separately stored in the TDDS so that file system-related information can be extracted from the LRA by obtaining the LRA from the TDDS without reproducing the TRRI. For example, when an address is incremented, the largest LRA among the LRAs of the recording area entries becomes the LRA of the entire data area 320 of the medium 300.

A final TDDS, the (n−1)th TDDS 400, is recorded in a last part of a temporary disc management area (TDMA) 340 of the lead-in area 310. The data area 320 is divided into two recording ranges. Data is recorded from A0 351 to KRA0 352 in the recording range #0 350, and data is recorded from A1 361 to LRA1 362 in the recording range #1 360.

Figure 4A:
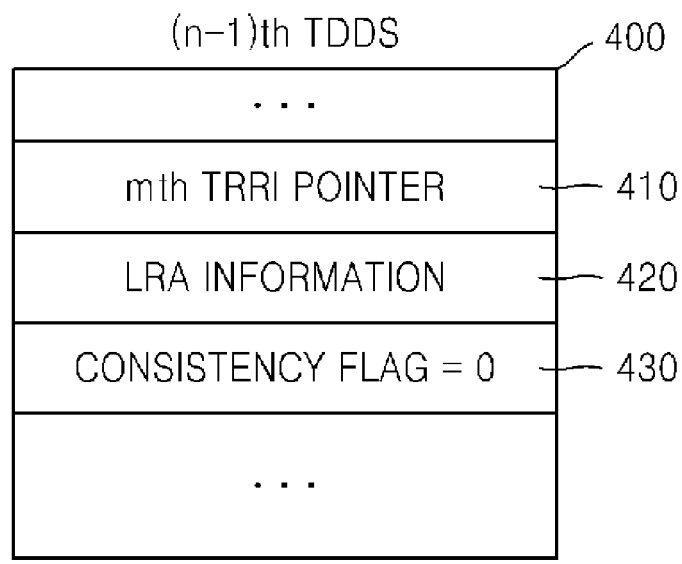
FIGS. 4A and 4B illustrate an (n−1)th TDDS and an mth TRRI, respectively, according to a recording status of the information recording medium of FIG. 3.
Figure 4B:
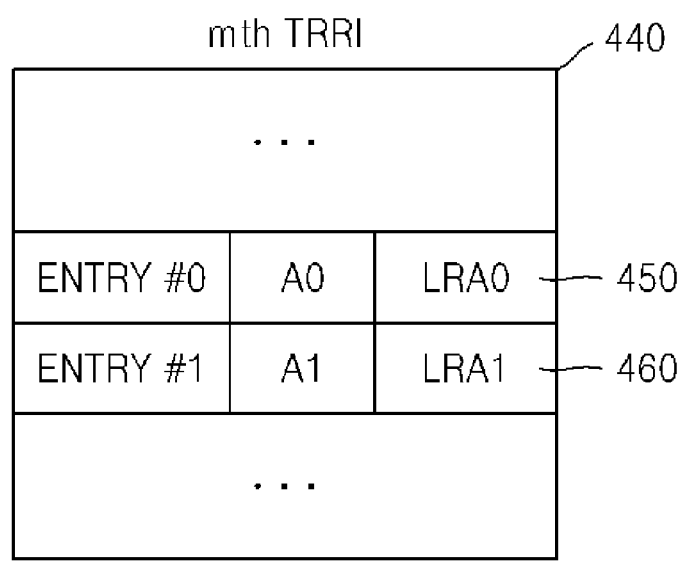

The (n+1)th TDDS 400 and mth TRRI 440 that are recorded according to the above method are shown in FIGS. 4A and 4B, respectively. Referring to FIG. 4A, the (n−1)th TDDS 400 comprises an mth TRRI pointer 410, LRA information 420, and a consistency flag 430 that is shown as set to "0". The consistency flag 430 indicates that the LRA information 420 of the (n−1)th TDDS 400 is consistent with the actual recorded location.

Referring to FIG. 4B, the mth TRRI 440 comprises an entry #0 450 and an entry #1 460. The entry #0 450 indicates that a start address of the recording range #0 is A0 and that a last recorded address of the recording range #0 is LRA0. The entry #1 460 indicates that a start address of the recording range is A1 and a last recorded address is LRA1. Although not shown, according to other aspects of the present invention the TRRI may be arranged on the TDMA together with the TDDS.

According to another embodiment of the present invention, the consistency flag 430 may indicate that LRA information of each entry of the mth TRRI 440 is consistent with the last recorded location of each recording range as well as that the LRA information 420 of the (n−1)th TDDS 400 is practically consistent with the actual last recorded location. For example, when either the LRA information of the (n−1)th TDDS 400 or the LRA information of the mth TRRI 440 is not consistent with the actual LRA, the consistency flag 430 may be set to "No."

Figure 5:
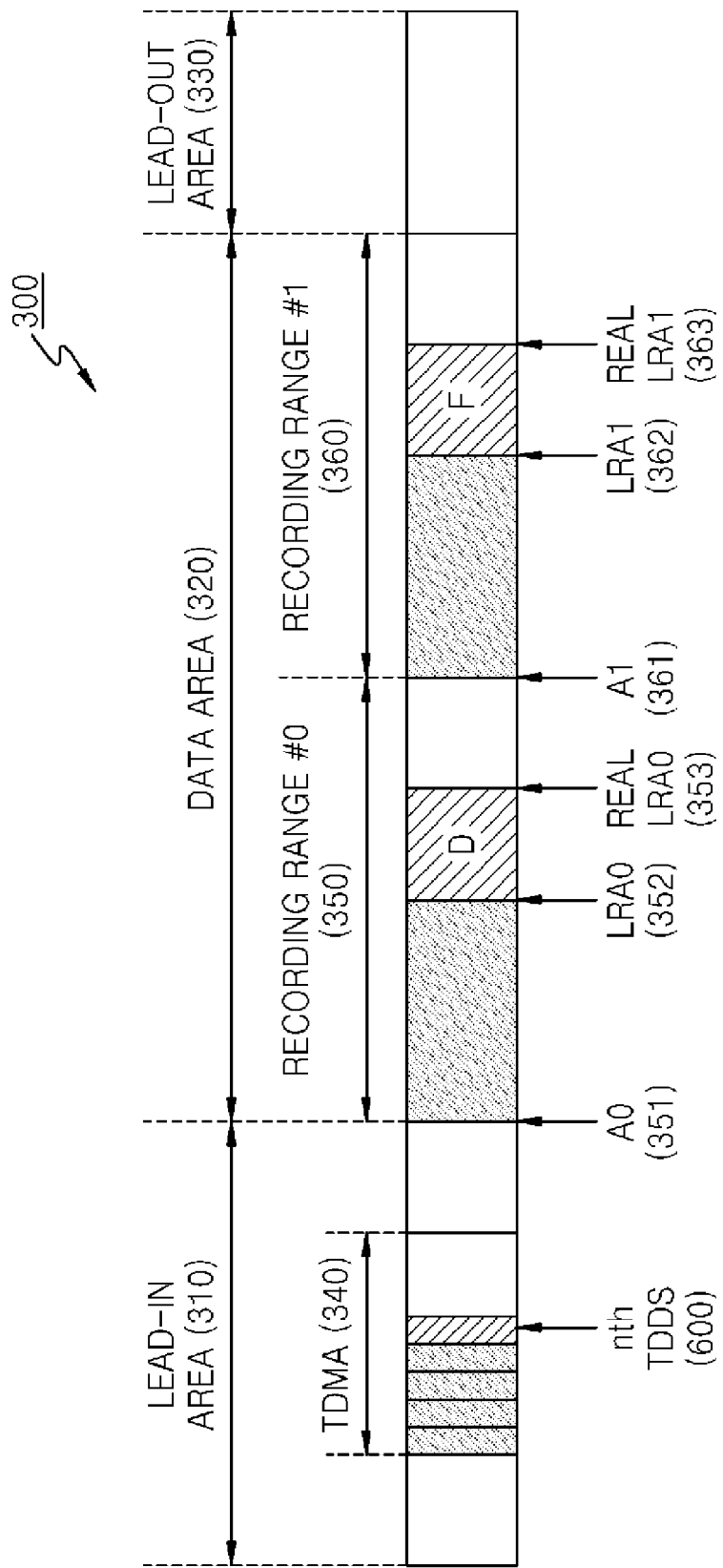
FIG. 5 illustrates a state of the write-once information recording medium of FIG. 3 after user data is added and file system information is additionally recorded.

FIG. 5 shows a state of the write-once information recording medium 300 of FIG. 3 after user data is added and file system information is additionally recorded. Since data D is added after the LRA0 352 of the recording range #0 350, an actual last recorded address of the recording range #0 350 is REAL LRA 0 353, and since the file system related information F is updated in the recording range #1 360 resulting from an addition of the data D, an actual last recorded address of the recording range #1 360 is REAL LRA1 363.

Figure 6:
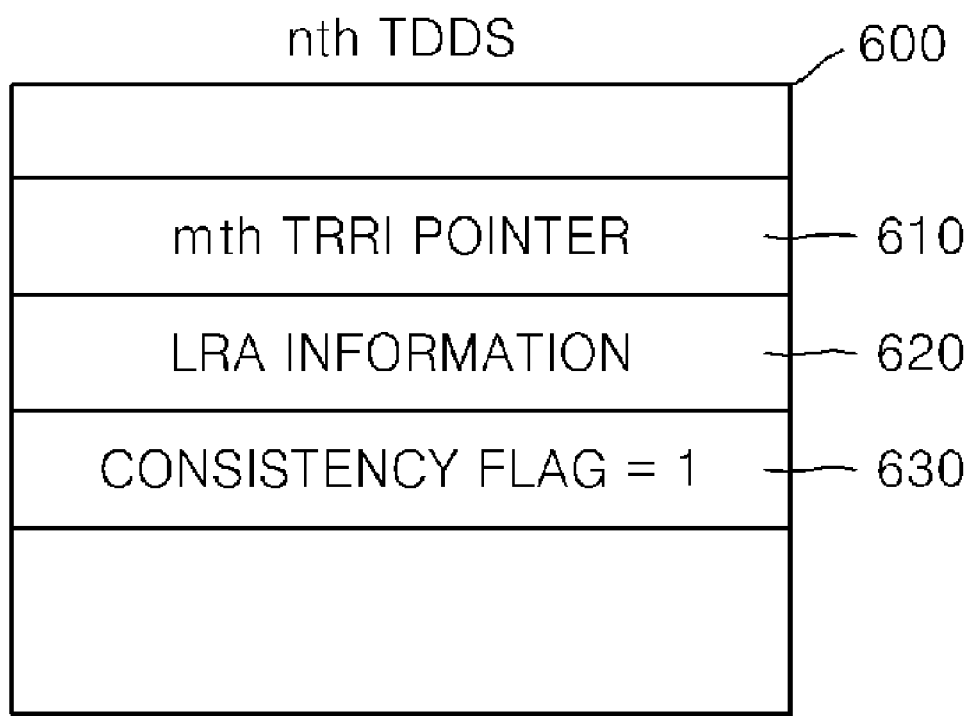
FIG. 6 illustrates an nth TDDS of the information recording medium of FIG. 5.

When nth TDDS 600 is recorded in the TDMA without updating the TRRI before the file system information is recorded but after the data D is additionally recorded after the LRA0 of the recording range #0 350, an nth TDDS 600 may be recorded as shown in FIG. 6. TRRI pointer information 610 of the nth TDDS 600 indicates the mth TRRI pointer 410 (referring to FIG. 4). LRA information 620 indicates the LRA1 362 (referring to FIG. 5). A consistency flag 630 is shown as set to "1" so that it is possible to indicate that the actual LRA is not consistent with either the LRA information in an nth TDDS 600 or the LRA information in the TRRI.

As such, when the nth TDDS 600 is recorded, the (n+1)th TDDS is not required to be recorded after the actual last recorded address of the data area 320 is changed to the REAL LRA1 363 (referring to FIG. 5) when the file system data is recorded in the recording range #1 360. This is because the consistency flag 630 of the nth TDDS 600 already indicates the inconsistency between the actual last recorded address and LRA information included in both the nth TDDS 600 and the TRRI.

Figure 7:
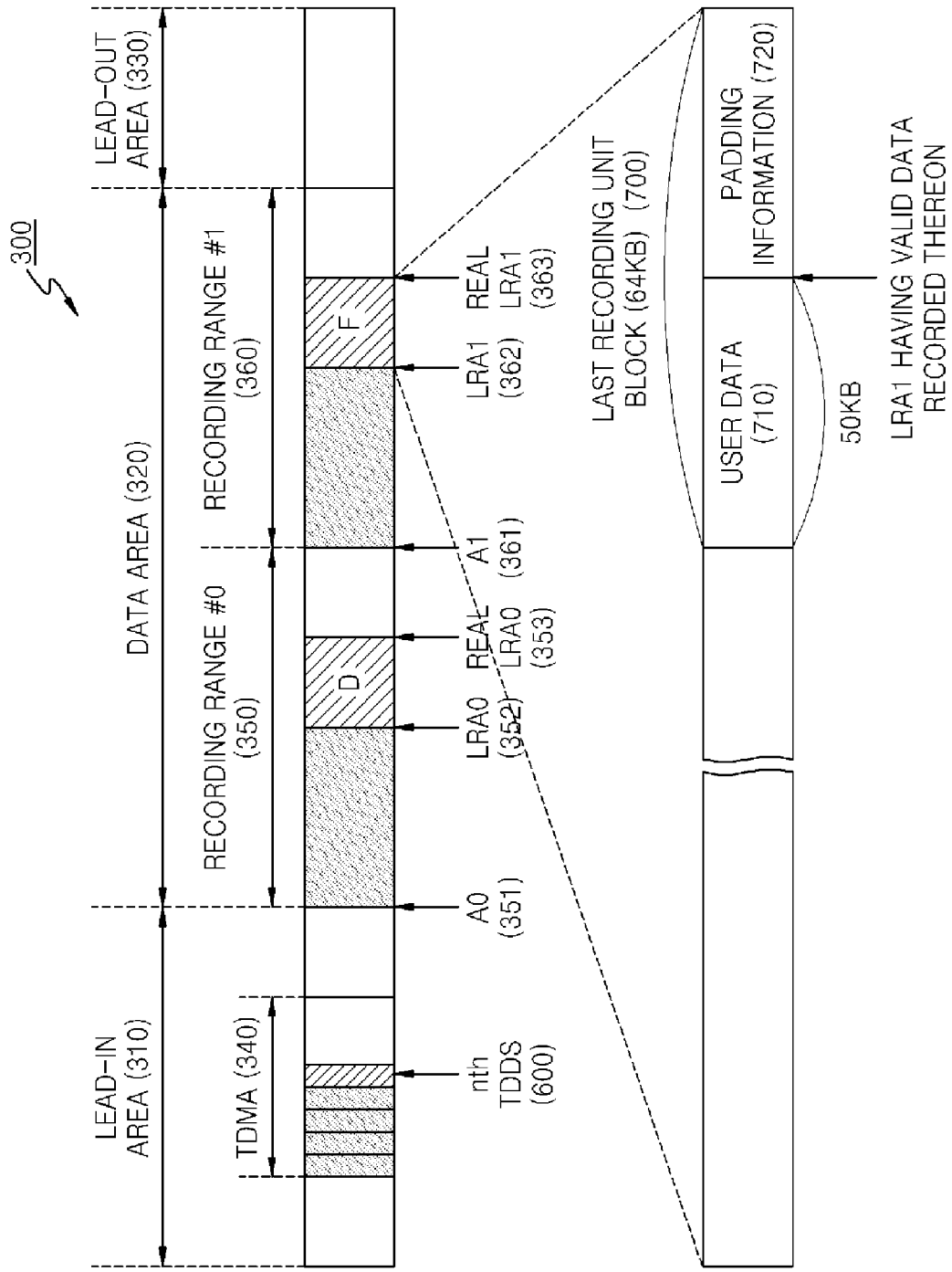
FIG. 7 is a reference diagram to explain how a drive system can detect a last recorded location of the data area of the recording medium of FIG. 5 which has the mth TDDS 600 of FIG. 6.

FIG. 7 is a diagram to explain how a drive system can detect a last recorded location of the data area 320 of the recording medium shown in FIG. 5, which has the nth TDDS 600 in FIG. 6. The drive system confirms the LRA information 620 recorded in the nth TDDS 600. Since the LRA information 620 indicates the LRA1 362, the drive system searches a last recording unit block 700 among data recorded after the LRA1 362. If the last recording unit block 700 of 64 KB includes user data 710 of 50 KB and padding data 720, the user data 710 indicates a last recorded location as LRA1 where valid data is recorded. A location or a size of the padding data 720 can be learned with reference to padding information, and the padding information can be included in the recording unit block or can be located outside.

At the point of finalization for using the write-once information recording medium solely for reproducing data, a final TDDS which is recorded in the TDMA is transferred and recorded in a separately located defect management area (DMA). At this time, the LRA of the TDDS should have its information changed so as to indicate an actual REAL LRA, have a consistency flag for the LRA displayed as "consistent," and be transferred and recorded in the DMA. Although not shown in FIG. 2, 3, or 5, the DMA may be disposed in either the lead-in area 310 or the lead-out area 330.

Figure 8:
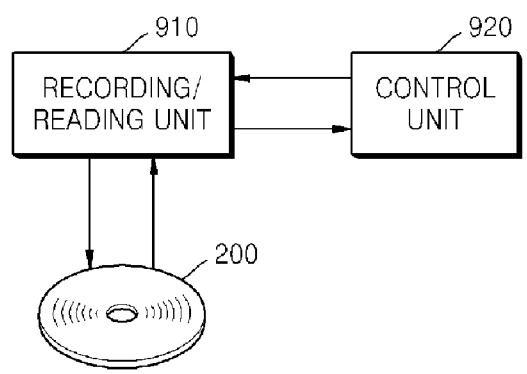
FIG. 8 illustrates a recording and/or reproducing apparatus, according to an embodiment of the present invention.

FIG. 8 shows a recording and/or reproducing apparatus according to an embodiment of the present invention. The recording and/or reproducing apparatus comprises a recording/reading unit 910, and a control unit 920. According to other aspects of the present invention, the recording and/or reproducing apparatus may have additional and/or different units. Similarly, the functionality of the above units may be integrated into a single component. The recording/reading unit 910 records data in the write-once information recording medium 200 under the control of the control unit 920, and reads the recorded data.

The control unit 920 controls the recording/reading unit 910 to record or read the data in the write-once information recording medium 200, creates temporary disc management information including information regarding a last recorded address and consistency information, controls the recording/reading unit 910 to record the information when recording data, and determines a last recorded address of the information recording medium 200 by reading the temporary disc management information from the information reading medium 200 when reproducing data. Recording data and reproducing data can be implemented by different apparatuses, or by a single system as shown in FIG. 8.

Figure 9:
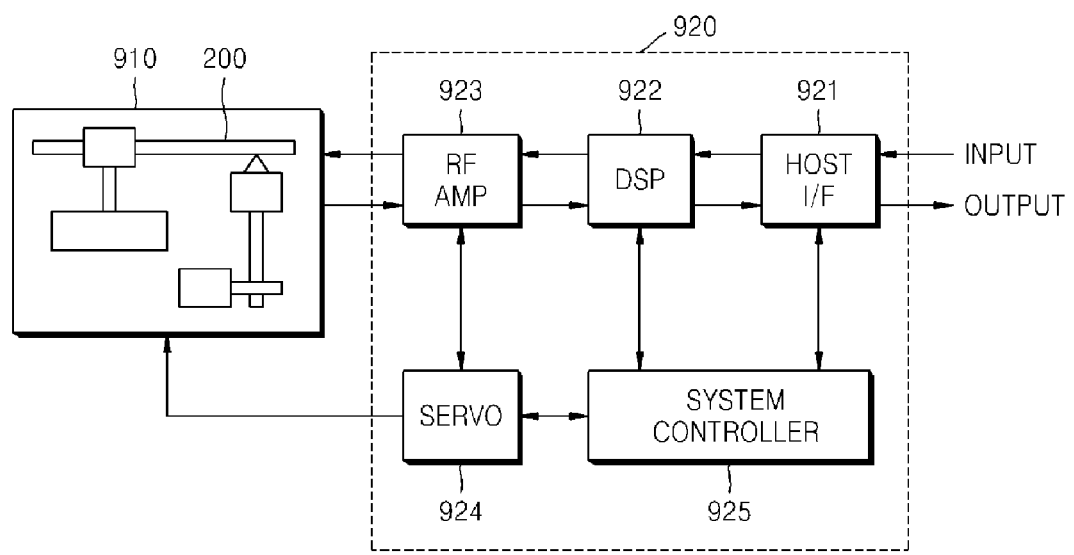
FIG. 9 illustrates a drive in which the recording and/or reproducing apparatus of FIG. 8 is implemented.

FIG. 9 shows a drive in which the recording and/or reproducing apparatus of FIG. 8 is implemented. The drive employs the recording/reading unit 910 as a pick-up. The write-once information recording medium 200 is mounted in the pick-up. The drive employs a host interface (I/F) 921, a DSP 922, an RF AMP 923, a SERVO 924, and a system controller 925 as the control unit 920.

For recording data, the host I/F 921 receives a recording command with data to be recorded from a host (not shown). The system controller 925 performs initialization necessary for recording. The DSP 922 performs ECC encoding by adding additional data such as parity for error correction to the data to be recorded, and modulates the ECC encoded data, according to a predetermined method. The RF AMP 923 converts the data output from the DSP 922 into an RF signal. The pick-up 910 records the RF signal output from the RF AMT 923 in the write-once information recording medium 200. The SERVO 924 receives a command necessary for a servo-control from the system controller 925 so as to servo-control the pick-up 910. The system controller 925 issues a command to the pick-up 910 to read the recorded data or to record predetermined data such as temporary management information for defect management.

According to an embodiment of the present invention, the system controller 925 creates temporary disc management information, which includes information regarding a last recorded location of data in the data area and information regarding a consistency between the information regarding the last recorded location and an actual last recorded location of the data area, to manage the write-once information recording medium 200, and controls the pick-up 910 to record the created temporary disc management information in the write-once information recording medium 200. The information regarding the consistency may be set to a first value to indicate that the information regarding the last recorded location is consistent with the actual last recorded location of the data area, or set to a second value to indicate that the information regarding the last recorded location is not consistent with the actual last recorded location of the data area.

When finalizing the information recording medium 200, the system controller 925 creates final temporary disc management information, which includes the information regarding the last recorded location changed to the actual last recorded location of the data area and the information regarding the consistency to indicate that the information regarding the last recorded location is consistent with the actual last recorded location of the data area. The system controller 925 then controls the pick-up 910 to record the final temporary disc management information in a disc management area of the information recording medium 200.

When data is reproduced, the host I/F 921 receives a reproducing command from a host (not shown). The system controller 925 performs initialization necessary for reproduction. The pick-up 910 emits laser beams to the write-once information recording medium 200, and outputs optical signals obtained by receiving laser beams reflected from the write-once information recording medium 200. The RF AMP 923 converts the optical signals output from the pick-up 910 into RF signals, and provides demodulated data obtained from the RF signals and servo signals obtained from the RF signals to the SERVO 924. The DSP 922 demodulates the modulated data and outputs data obtained by ECC error correction. The SERVO 924 receives the servo signals from the RF AMP 923 and a command necessary for servo-control from the system controller 925 to perform servo-control. The host I/F 921 transmits data received from the DSP 922 to the host.

According to an embodiment of the present invention, the system controller 925 controls the pick-up 910 to read the temporary disc management information, which includes the information regarding the last recorded address of data in the data area and the information regarding the consistency between the information regarding the last recorded location and the actual last recorded location of the data area, from the information recording medium 200, and determines the last recorded location of the data area from the read temporary disc management information. The system controller 925 determines that the information regarding the last recorded location is consistent with the actual last recorded location of the data area when the information regarding the consistency is the first value, and determines that the information regarding the last recorded location is not consistent with the actual last recorded location of the data area when the information regarding the consistency is the second value.

If the information regarding the last recorded location is determined as inconsistent with the information regarding the actual last recorded location of the data area, the system controller 925 searches a remaining part after the last recorded location of the medium according to the information regarding the last recorded location for the actual last recorded location. The system controller 925 controls the pick-up 910 to read the final recorded recording unit block from a remaining part after the last recorded location of the medium according to the information regarding the last recorded location, and detects the actual last recorded location with reference to padding information included in the read recording unit block.

Figure 10:
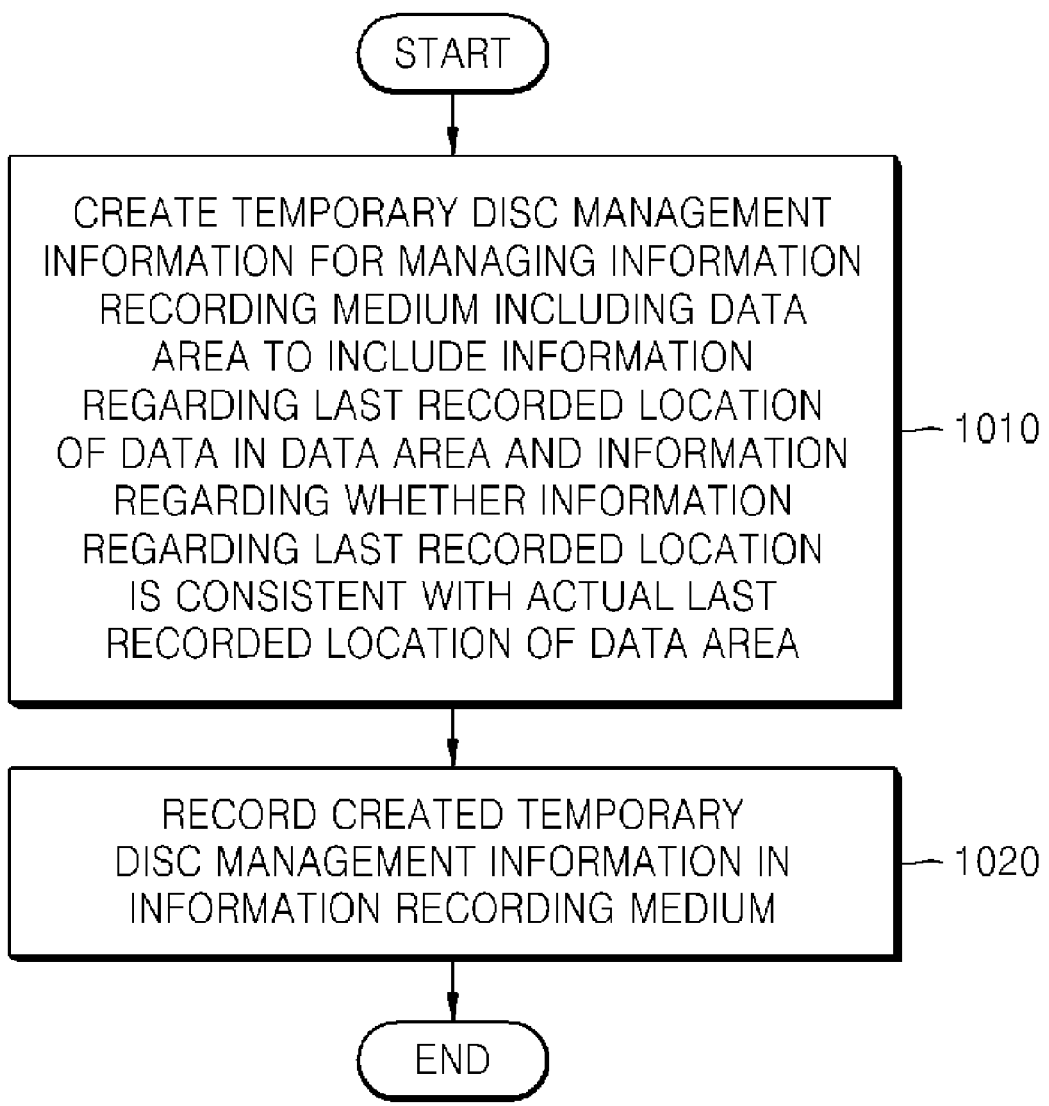
FIG. 10 is a flowchart of a recording process, according to an embodiment of the present invention.

FIG. 10 is a flowchart of a recording process, according to an embodiment of the present invention. Temporary disc management information to manage an information recording medium including a data area is created to include information regarding a last recorded location of data in the data area and information regarding whether the information regarding the last recorded location is consistent with an actual last recorded location of the data area in operation 1010. If the information regarding the consistency is a first value, the information indicates that the information regarding the last recorded location is consistent with the actual last recorded location of the data area. If the information regarding the consistency is a second value, the information indicates that the information regarding the last recorded location is not consistent with the actual last recorded location of the data area. The created temporary disc management information is recorded in the information recording medium in operation 1020.

Figure 11:
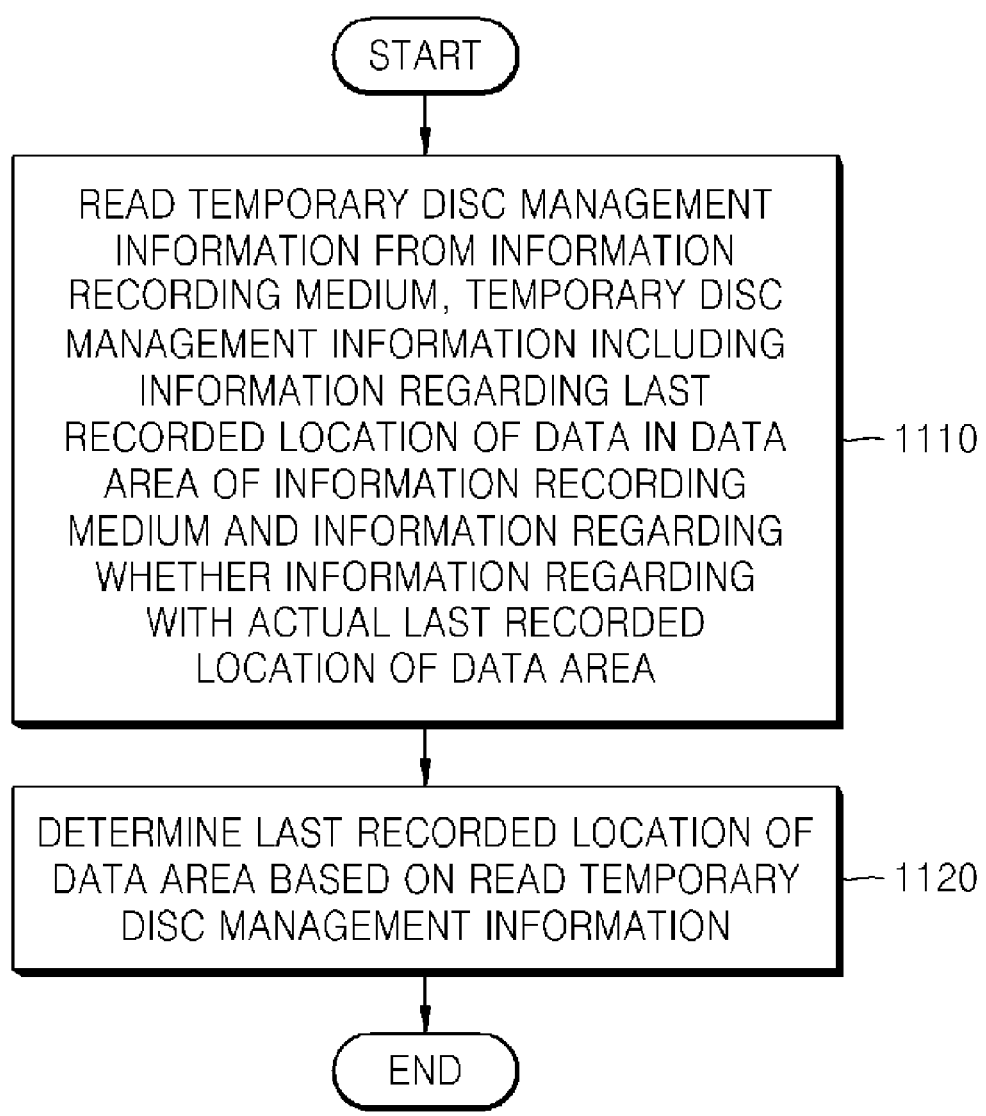
FIG. 11 is a flowchart of a reproducing process, according to an embodiment of the present invention.

FIG. 11 is a flowchart of a reproducing process according to an embodiment of the present invention. Temporary disc management information, which includes information regarding a last recorded location of data in a data area of an information recording medium and information regarding whether the information regarding the last recorded location is consistent with an actual last recorded location of the data area, is read from the information recording medium in operation 1110. If the information regarding the consistency is the first value, then the information regarding the last recorded location is determined to be consistent with the actual last recorded location. If the information regarding the consistency is the second value, then the information regarding the last recorded location is determined not to be consistent with the actual last recorded location. The last recorded location of the data area is determined based on the read temporary disc management information in operation 1120.

Aspects of the present invention can also be embodied as computer readable codes on a computer readable recording medium. The computer readable recording medium is a data storage device that can store data which can be thereafter read by a computer system. Examples of the computer readable recording medium include read-only memory (ROM), random-access memory (RAM), CD-ROMs, magnetic tapes, floppy disks, and optical data storage devices. Aspects of the present invention may also be embodied as carrier waves (such as data transmission through the Internet). The computer readable recording medium can also be distributed over network-coupled computer systems so that the computer readable code is stored and executed in a distributed fashion. Functional programs, codes, and code segments to accomplish aspects of the present invention can be easily construed by programmers skilled in the art to which the present invention pertains.

According to aspects of the present invention, when a last recorded location of a data area is recorded in an information recording medium, the convenience of operating a drive system can be achieved by using a consistency flag, which indicates information that represents whether or not the last recorded location is consistent with an actual last recorded location, without detecting and recording the actual last recorded location.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information recording medium comprising:
   a data area to record user data;
   temporary recording management information to manage a data recording status of the data area; and
   temporary disc management information to manage the information recording medium,
   wherein the temporary disc management information includes first information regarding a last recorded location of data in the data area and second information regarding whether the information regarding the last recorded location is consistent with an actual last recorded location of the data area.

2. The information recording medium of claim 1, wherein:
   the second information indicates that the information regarding the last recorded location is consistent with the actual last recorded location of the data area when the second information is a first value; and
   the second information indicates that the information regarding the last recorded location is not consistent with the actual last recorded location when the second information is a second value.

3. The information recording medium of claim 1, wherein, when the information recording medium is finalized, the first information in final temporary disc management information is changed to information regarding the actual last recorded location of the data area, and the second information in the final temporary disc management information is changed to information indicating that the information regarding the last recorded location is consistent with the actual last recorded location of the data area, and the final temporary disc management information is recorded in a disc management area of the information recording medium.

4. An apparatus to record data to an information recording medium including a data area, the apparatus comprising:
   a pickup to emit a light so as to transfer data with respect to the information recording medium; and
   a control unit to generate temporary disc management information to manage the information recording medium, the temporary disc management information including first information regarding a last recorded location of data in the data area and second information regarding whether the information regarding the last recorded location is consistent with an actual last recorded location of the data area, and to control the pickup to record the generated temporary disc management information on the information recording medium.

5. The apparatus of claim 4, wherein:
   the second information indicates that the information regarding the last recorded location is consistent with the actual last recorded location of the data area when the second information is a first value; and
   the second information indicates that the information regarding the last recorded location is not consistent with the actual last recorded location when the second information is a second value.

6. The apparatus of claim 4, wherein, when the information recording medium is finalized, the control unit changes the first information in final temporary disc management information to information regarding the actual last recorded location of the data area, changes the second information in the final temporary disc management information to information indicating that the information regarding the last recorded location is consistent with the actual last recorded location of the data area, and controls the pickup to record the final temporary disc management information on a disc management area of the information recording medium.

7. An apparatus to reproduce data from an information recording medium including a data area, the apparatus comprising:
   a pickup to emit or receive a light so as to transfer data with respect to the information recording medium; and
   a control unit to control the pickup to read temporary disc management information that includes first information regarding a last recorded location of data in the data area and second information regarding whether the information regarding the last recorded location is consistent with an actual last recorded location of the data area, and to determine the last recorded location of the data area based on the read temporary disc management information.

8. The apparatus of claim 7, wherein the control unit determines that the information regarding the last recorded location is consistent with the actual last recorded location of the data area when the second information is a first value, and determines that the information regarding the last recorded location is not consistent with the actual last recorded location of the data area when the second information is a second value.

9. The apparatus of claim 8, wherein the control unit searches a remaining part after the last recorded location of the information recording medium according to the information regarding the last recorded location for an actual last recorded location when the control unit determines that the information regarding the last recorded location is not consistent with the actual last recorded location of the data area.

10. The apparatus of claim 9, wherein the control unit controls the pickup to read a final recorded recording unit block from a remaining part after a last recorded location of the information recording medium according to the information regarding the last recorded location, and detects a actual last recorded location with reference to padding information included the read recording unit block.

11. A method of recording data in an information recording medium including a data area, the method comprising:
    generating temporary disc management information to manage the information recording medium, the temporary disc management information comprising first information regarding a last recorded location of data in the data area and second information regarding whether the information regarding the last recorded location is consistent with an actual last recorded location of the data area; and
    recording the generated temporary disc management information onto the information recording medium.

12. The method of claim 11, wherein:
    when the second information is a first value, the second information indicates that the information regarding the last recorded location is consistent with the actual last recorded location of the data area; and
    when the second information is a second value, the information indicates that the information regarding the last recorded location is not consistent with the actual last recorded location.

13. The method of claim 11, further comprising, when the information recording medium is finalized:
    changing the first information in final temporary disc management information to information regarding the actual last recorded location of the data area;
    changing the second information in the final temporary disc management information to information indicating that the information regarding the last recorded location is consistent with the actual last recorded location of the data area; and
    recording the final temporary disc management information on a disc management area of the information recording medium.

14. A method of reproducing data from an information recording medium including a data area, the method comprising:
    reading temporary disc management information from the information recording medium, the temporary disc management information comprising first information regarding a last recorded location of data in the data area and second information regarding whether the information regarding the last recorded location is consistent with an actual last recorded location of the data area;
    determining a last recorded location of the data area based on the read temporary disc management information; and
    reproducing the data from the information recording medium based on the last recorded location of the data area.

15. The method of claim 14, wherein the determining of the last recorded location comprises:
    determining that the information regarding the last recorded location is consistent with the actual last recorded location of the data area when the second information is a first value; and
    determining that the information regarding the last recorded location is not consistent with the actual last recorded location of the data area when the second information is a second value.

16. The method of claim 15, further comprising:
    searching a remaining part after a last recorded location of the information recording medium according to the information regarding the last recorded location for an actual last recorded location when it is determined that the information regarding the last recorded location is not consistent with the actual last recorded location of the data area.

17. The method of claim 15, wherein the searching for the actual last recorded location comprises:
    reading a final recorded recording unit block from a remaining part after the last recorded location of the information recording medium according to the information regarding the last recorded location; and
    detecting the actual last recorded location with reference to padding information included in the read recording unit block.

* * * * *